US005838536A

United States Patent [19]

Miyazawa et al.

[11] Patent Number: 5,838,536

[45] Date of Patent: Nov. 17, 1998

[54] DISPLAY DEVICE HAVING TILT MECHANISM FOR ADJUSTMENT WITH RESPECT TO OPERATOR DEVICE

[75] Inventors: Kenichi Miyazawa; Noboru Ishii, both of Kawasaki, Japan

[73] Assignee: Fujitsu Limited, Kanagawa, Japan

[21] Appl. No.: 753,494

[22] Filed: Nov. 26, 1996

[30] Foreign Application Priority Data

Nov. 30, 1995 [JP] Japan .................................... 7-312161

[51] Int. Cl.[6] ........................................ G06F 1/16

[52] U.S. Cl. ........................................ 361/681

[58] Field of Search .................................... 395/216, 225; 361/681, 682; 248/917–923, 361; 705/1, 14, 15, 16, 20, 22, 24

[56] References Cited

U.S. PATENT DOCUMENTS

D. 333,147 2/1993 Miyake et al. ............................ D18/4
4,937,563 6/1990 Shekita et al. ...................... 361/686 X
5,187,641 2/1993 Muskatello et al. .................... 361/682
5,268,817 12/1993 Miyagawa et al. ..................... 361/681
5,569,895 10/1996 Lynch et al. ........................ 248/923 X

FOREIGN PATENT DOCUMENTS 2 200 783 8/1988 United Kingdom .

OTHER PUBLICATIONS

Great Britain Patent Office Communication with attached Search Report dated Feb. 11, 1997.

*Primary Examiner*—Michael W. Phillips
*Attorney, Agent, or Firm*—Armstrong, Westerman, Hattori, McLeland & Naughton

[57] ABSTRACT

A display device includes a display portion and a tilt mechanism. The tilt mechanism can be rotated around a rotation center and the display device can be installed on and removed from an external device such as a keyboard, bar code reader and a POS terminal. The display device may include a fixing member, used for fixing the display device to the external device, provided with the tilt mechanism.

15 Claims, 9 Drawing Sheets

DISPLAY DEVICE HAVING TILT MECHANISM FOR ADJUSTMENT WITH RESPECT TO OPERATOR DEVICE

BACKGROUND OF THE INVENTION

The present invention generally relates to a display device having a tilt mechanism, and particularly, to a display device which may be provided with a terminal such as a point-of-sale (POS) terminal of a POS system and displays such elements as names, prices and a total price of commodities purchased to a customer (a customer display).

Recently, control of commodities using optically readable marks such as a bar code have been widespread among retail stores of many kinds. Accordingly, a demand for a system such as a point-of-sale (POS) system which is necessary for such control of commodities has increased.

In the POS system, an apparatus for reading optical marks such as a bar code reader for reading bar codes has been widely used to input the information of commodities. The information of a particular commodity is sought through a commodity file, input in the terminal beforehand, based on a read bar code information.

A display device a so called "customer display" has been commonly used and is provided with a POS terminal for showing information such as the names, prices and a total price of commodities to a customer who bought the commodities so that he/she can confirm such information.

However, in some cases, no bar code is attached to a certain commodity. For instance, it is difficult to attach a bar code to fresh foods such as vegetables. In order to put information about these commodities into the POS terminal, an input device called a price look-up (PLU) keyboard is usually provided with the terminal.

FIG. 1 is a diagram showing a typical counter of the POS system. As shown in FIG. 1, the counter is provided with a POS terminal together with a bar code reader and a PLU keyboard as explained above.

In this kind of counter shown in FIG. 1, each bar code attached to a commodity is read by passing a particular commodity in front of the bar code reader with the side to which a bar code is attached facing the bar code reader. This handling of commodities is carried out by an operator.

Since the bar code reader is used to input the information of commodities most of the times, it is preferable that the operator is always in a particular position in front of the bar code reader and is not required to be moved around. For this reason, the PLU keyboard is provided in the vicinity of the bar code reader, as shown in FIG. 1, and the keyboard is facing the operator side (inside of the counter).

The angle of the PLU keyboard is adjustable so that an operator can type the keyboard in a most suitable condition for the operator. In the case of the PLU keyboard shown in FIG. 1, the angle of the PLU keyboard is adjustable in a direction indicated by the arrow.

Here, by providing the above-mentioned customer display on the other side of the PLU keyboard (facing the customer side), it is possible to show a customer information such as prices of commodities so that he/she can confirm such information.

However, such a customer display provided with a PLU keyboard, as mentioned above, has been conventionally fixed to the PLU keyboard. Thus, if an operator adjusts the angle of the PLU keyboard in a way to suit him/her, the angle of the customer display is also changed in accordance with the angle change of the PLU keyboard. Also, the position at which the customer display is fixed is dependent on a fixing position of the PLU keyboard.

For these reasons, there are problems for the conventional customer display such as the adjustment of the angle of the PLU keyboard for an operator quite often leads to an inconvenient position and angle of the customer display for a customer, and therefore the quality of the service for the customer is lowered.

On the other hand, if the position and angle of the customer display is set so as to be suitable for a customer, an operation of the PLU keyboard for an operator will not be so easy and will cause problems such as tiredness of eyes and/or arms for the operator.

Also, since the customer display is formed together with the PLU keyboard, there is a problem in that flexibility of a fixing position of the customer display is limited. For instance, if it is required to separate the fixing position of the customer display from the position of the PLU keyboard in accordance with, say, the space of a counter in a shop, it is not possible to respond to such a request using a conventional customer display.

SUMMARY OF THE INVENTION

It is a general object of this invention to provide a display device in which the above mentioned problems are eliminated.

A more specific object of the present invention is to provide a display device which does not deteriorate the operability of a keyboard for an operator.

Another object of the present invention is to provide a display device which provides a convenient position and angle of the display for a customer so that the customer can easily confirm commodity information.

Yet another object of the present invention is to provide a display device which can be most suitably set in accordance with, for instance, the space available for a counter of a shop.

The objects described above are achieved by a display device comprising: a display portion and a tilt mechanism, wherein the tilt mechanism can be rotated around a rotation center and the display device can be installed on and removed from an external device.

The objects described above are also achieved by the display device, wherein a fixing member used for fixing the display device on the external device is provided with the tilt mechanism.

The objects described above are also achieved by the display device, wherein the fixing member is one of screws, adhering layers, adhesive sheets, suction discs and magnets.

The objects described above are also achieved by the display device, further comprising a connector for electrically connecting the display device to an external device.

The objects described above are also achieved by the display device, wherein the external device is one of a keyboard, a bar code reader and a POS terminal.

According to the above display device, since the tilt mechanism, rotatable around a rotation center, is provided with the display device, it is possible to adjust the angle of the display device regardless of the angle and fitting position of an external device to which the display device of the present invention is attached. Also, since the display device can be removed from the external device and then installed again, it is possible to change the fitting position of the display device if necessary.

The objects described above are also achieved by an input/output device comprised of: a keyboard portion having a plurality of keys, a display portion and a tilt mechanism, wherein the display portion is provided at a back of the keyboard portion having a plurality of keys, the display portion being connected to the key board portion through the tilt mechanism, and the tilt mechanism can be rotated around a rotation center so that an angle of the display portion with respect to the keyboard portion may be adjusted freely.

The objects described above are also achieved by the input/output device, wherein the display portion together with the tilt mechanism can be installed on and removed from the keyboard portion.

The objects described above are also achieved by the input/output device, wherein a fixing member used for fixing the display portion to the keyboard portion is provided with the tilt mechanism.

The objects described above are also achieved by the input/output device, wherein the fixing member is one of screws, adhering layers, adhesive sheets, suction discs and magnets.

The objects described above are also achieved by the input/output device, further comprising a connector for electrically connecting the input/output device to an external device.

According to the above input/output device, since the tilt mechanism, rotatable around a rotation center, is provided with the display portion, it is possible to adjust the angle of the display portion regardless of the angle of the keyboard portion to which the display portion is attached through the tilt mechanism. Also, since the display portion can be removed from the keyboard portion and then installed again, it is possible to change the fitting position of the display portion if necessary.

The objects described above are also achieved by a counter provided at least with a POS terminal, an input device and an display device for a customer, wherein the display device for the customer includes a display portion and a tilt mechanism, the tilt mechanism being rotatable around a rotation center and the display device being able to installed on and removed from at least one of the POS terminal and the input device.

The objects described above are also achieved by the counter, wherein a fixing member used for fixing the display device on the external device is provided with the tilt mechanism.

The objects described above are also achieved by the counter, wherein the fixing member is one of screws, adhering layers, adhesive sheets, suction discs and magnets.

The objects described above are also achieved by the counter, further comprising a connector for electrically connecting the display device to an external device.

According to the above counter, by providing a connector to various devices located on the counter, it is possible to fix the display device for customer at a desired position. Also, the angle of the display device may be adjusted so that a customer can easily see the display without degrading the operability of various devices operated by an operator.

Other objects and further features of the present invention will be apparent from the following detailed description when read in conjunction with the accompanied drawings.

DESCRIPTION OF THE PREFERRED EMBODIMENTS

In the following, a principle and embodiments of the present invention will be described with reference to the accompanying drawings. Note that in the following embodiments although only a customer display in the POS system will be explained, the display device of the present invention is applicable not only to the customer display but also to any other suitable kind of display devices.

Figure 1:
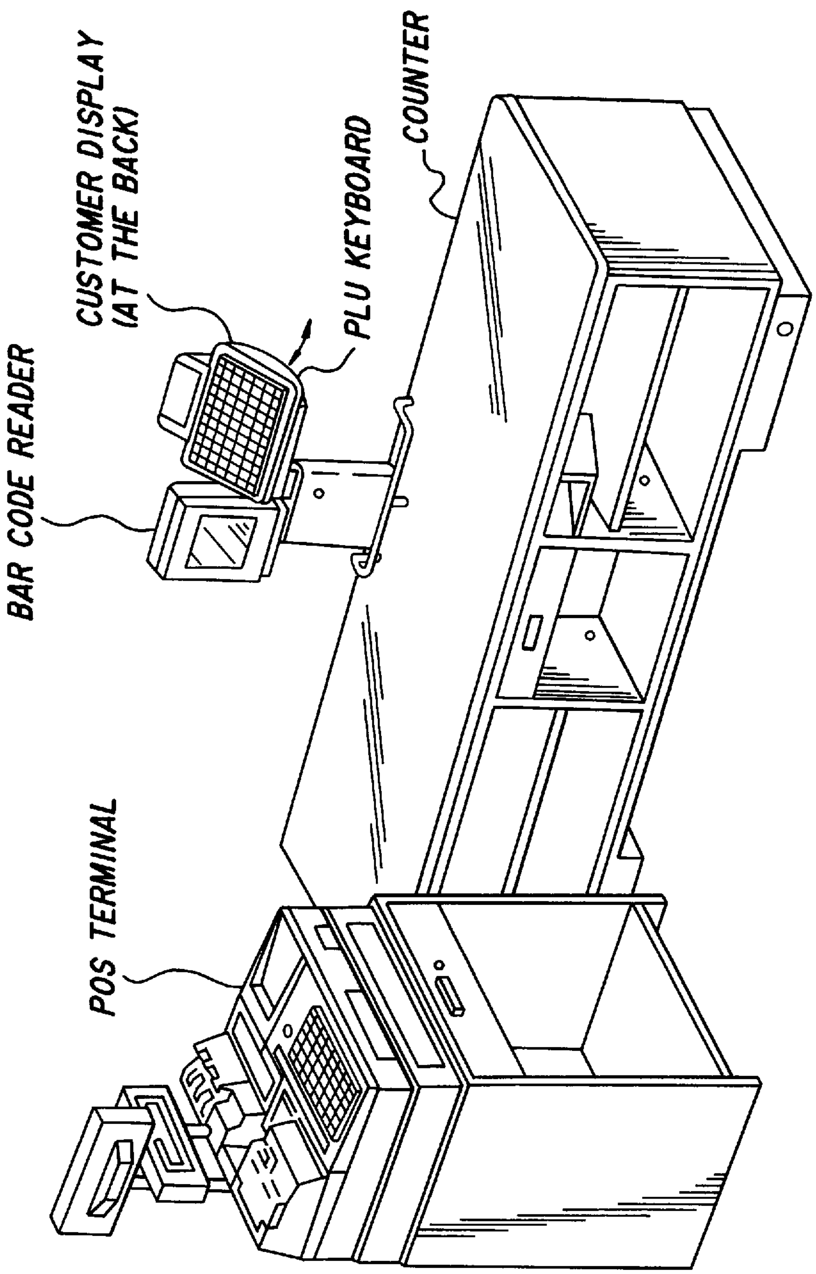
FIG. 1 PRIOR ART
FIG. 1 is a diagram showing a typical conventional counter of the POS system.
Figure 2A:
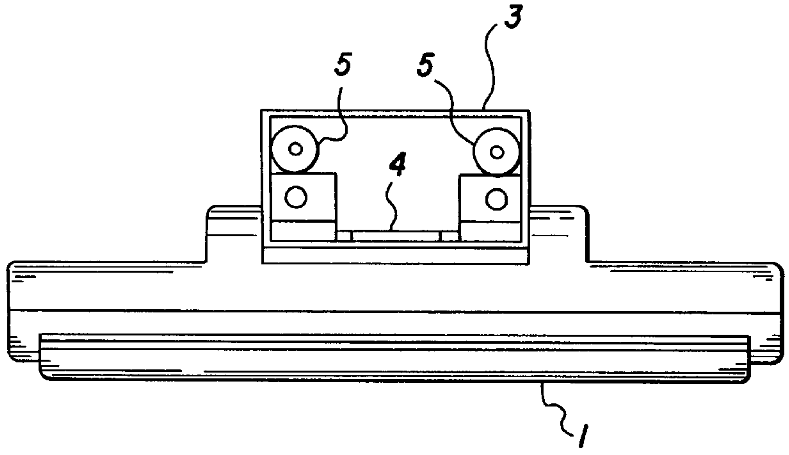
FIG. 2A is a top view of a customer display according to an embodiment of the present invention.
Figure 2B:
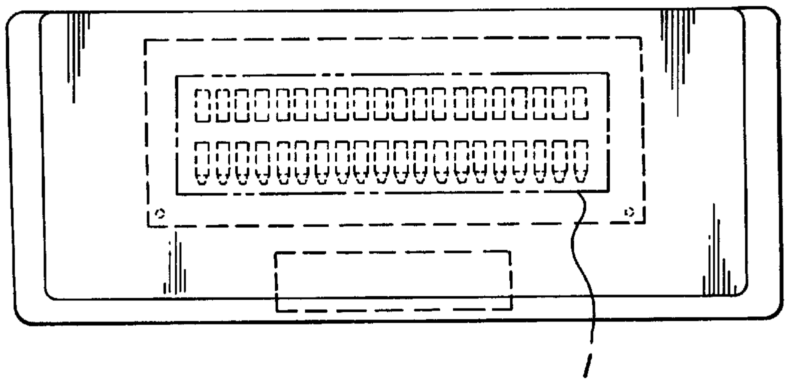
FIG. 2B is a front view of the customer display according to an embodiment of the present invention.
Figure 2C:
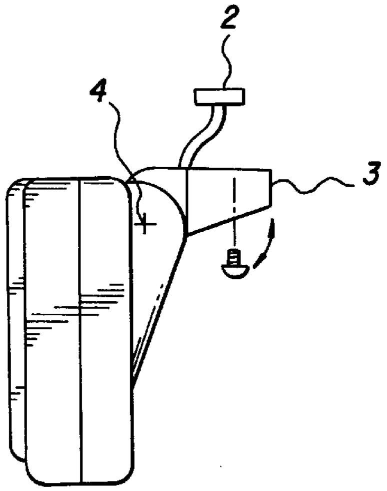
FIG. 2C is a side view of the customer display according to an embodiment of the present invention.

FIGS. 2A, 2B and 2C show a customer display according to an embodiment of the present invention. FIG. 2A is a top view, FIG. 2B is a front view and FIG. 2C is a side view of the customer display. In these figures, the customer display includes a display portion 1, a connector 2, and a tilt portion 3. The display portion 1 is a portion on which information such as a name, price and total price of commodities are displayed for a customer. The connector 2 may be connected to a PLU keyboard and so on. The tilt portion 3 includes screw holes 5 (in this case two screw holes) and is rotatably supported so that it may rotate around a rotation center 4. In this embodiment the tilt portion 3 may be rotated in a direction indicated by an arrow shown in FIG. 2C. This customer display may be attached to various devices used at a customer service counter, such as a PLU keyboard, by fixing the customer display on the back of the PLU keyboard using the screws.

Figure 3A:
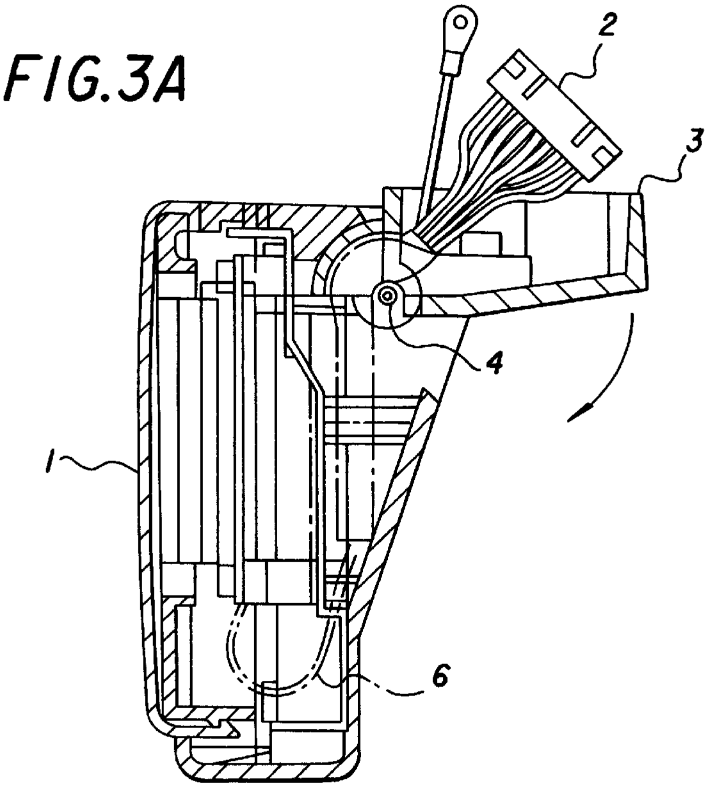
FIG. 3A is a cross-sectional view of the customer display according to the embodiment of the present invention, in which the tilt portion is most opened.
Figure 3B:
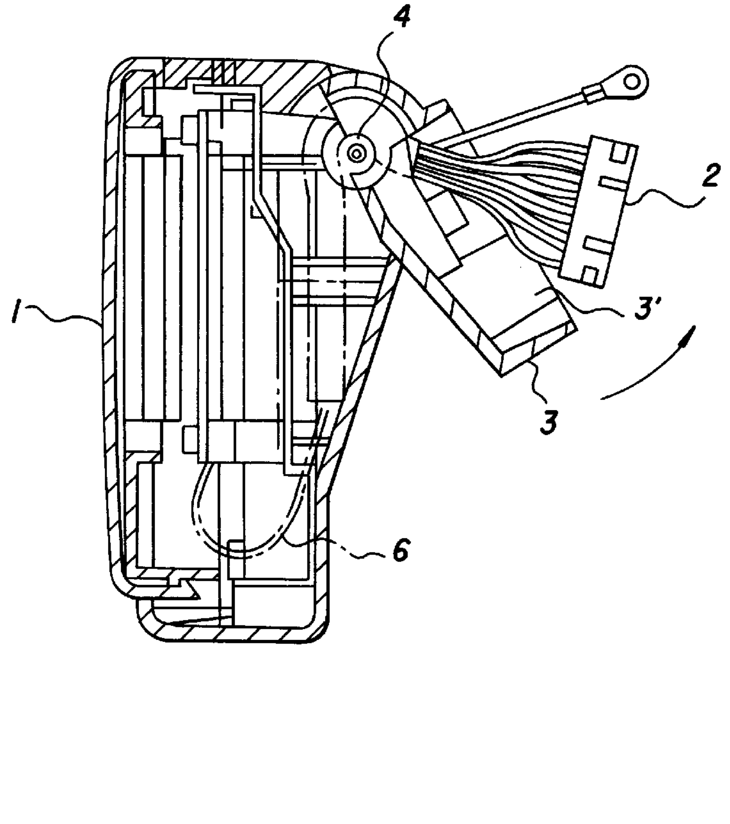
FIG. 3B is a cross-sectional view of the customer display according to the embodiment of the present invention, in which the tilt portion is most closed.

FIGS. 3A and 3B, respectively, show a cross-sectional view of the customer display according to the above embodiment of the present invention. FIG. 3A shows a state of the customer display in which the tilt portion is most opened and FIG. 3B shows a state of the customer display in which the tilt portion is most closed. As shown in FIGS. 3A and 3B, the display portion 1 is located on the left hand side of the customer display.

As explained above, a connector 2 which is connected to an external device for supplying power to the display is provided with the customer display. There is a space 3' inside of the tilt portion 3 as shown in FIG. 3B and the connector 2 may be accommodated in the space 3' of the tilt portion 3 when necessary.

As shown in FIGS. 3A and 3B, the tilt portion 3 is rotatably supported so that it can rotate around the rotation center 4. In this particular embodiment, the rotation angle of the tilt portion 3 is set to about 60°, however, the rotation angle is not limited to 60° and may be varied in accordance with a different situation.

The connector 3 and the display portion 1 are connected to each other by a cable 6. The cable 6 is used to supply power so as to display information and so forth.

Figure 4:
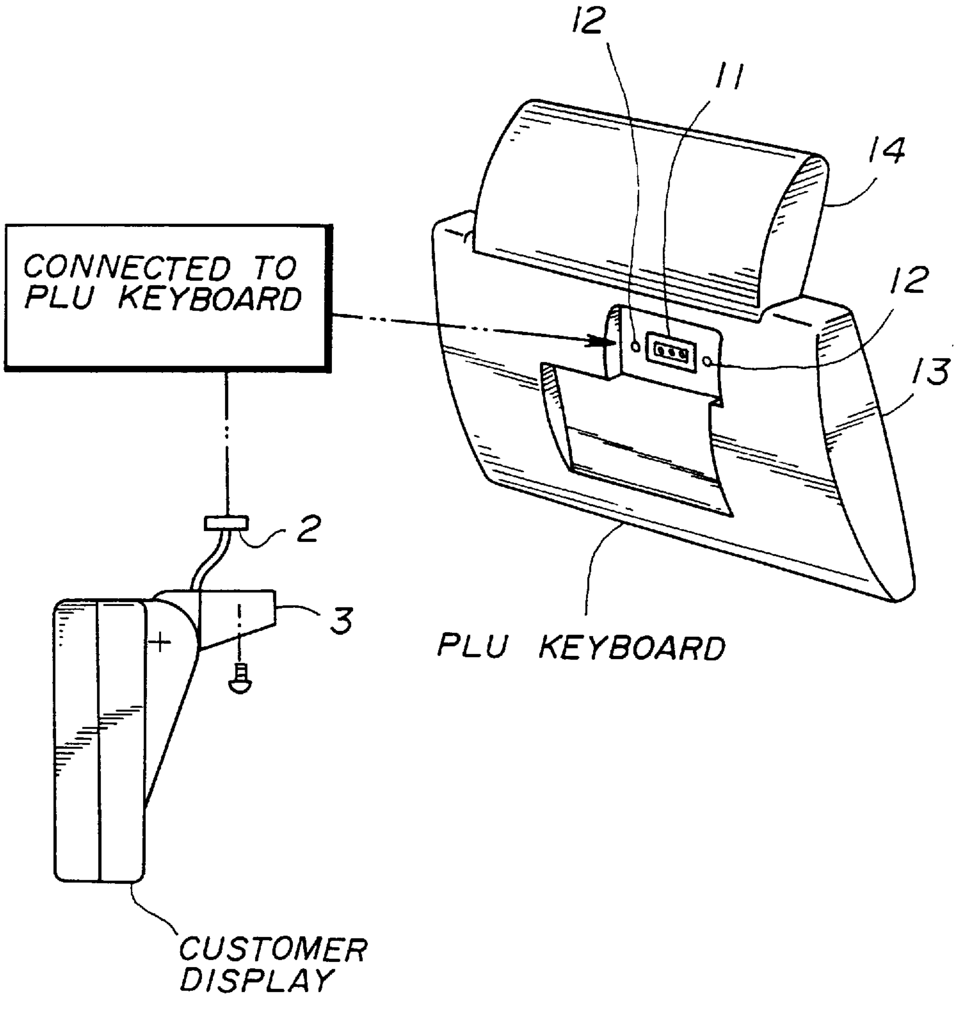
FIG. 4 is a diagram showing a back of a PLU keyboard and a side of a customer display according to the present invention.

FIG. 4 is a diagram showing a back of a PLU keyboard and a side of a customer display. Here, the PLU keyboard is used as an example of an external device to which the customer display of the present invention is attached. As mentioned above, the PLU keyboard is used to input information of a commodity to which no bar code is attached or in a case a bar code cannot be read properly for some reasons.

In FIG. 4, the PLU keyboard includes a connector 11, screw holes 12, a keyboard 13 and an operator display 14.

The connector 11 is provided at a back of the PLU keyboard as shown in FIG. 4. This connector 11 is to connect with the connector 3 of the customer display. Also, two screw holes 12 are formed on right and left hand sides of the connector 11, respectively. These screw holes 12 are provided in positions corresponding to the positions of the screw holes 5 of the customer display so that the PLU keyboard may be connected to the tilt portion 3 of the customer display.

Figure 5:
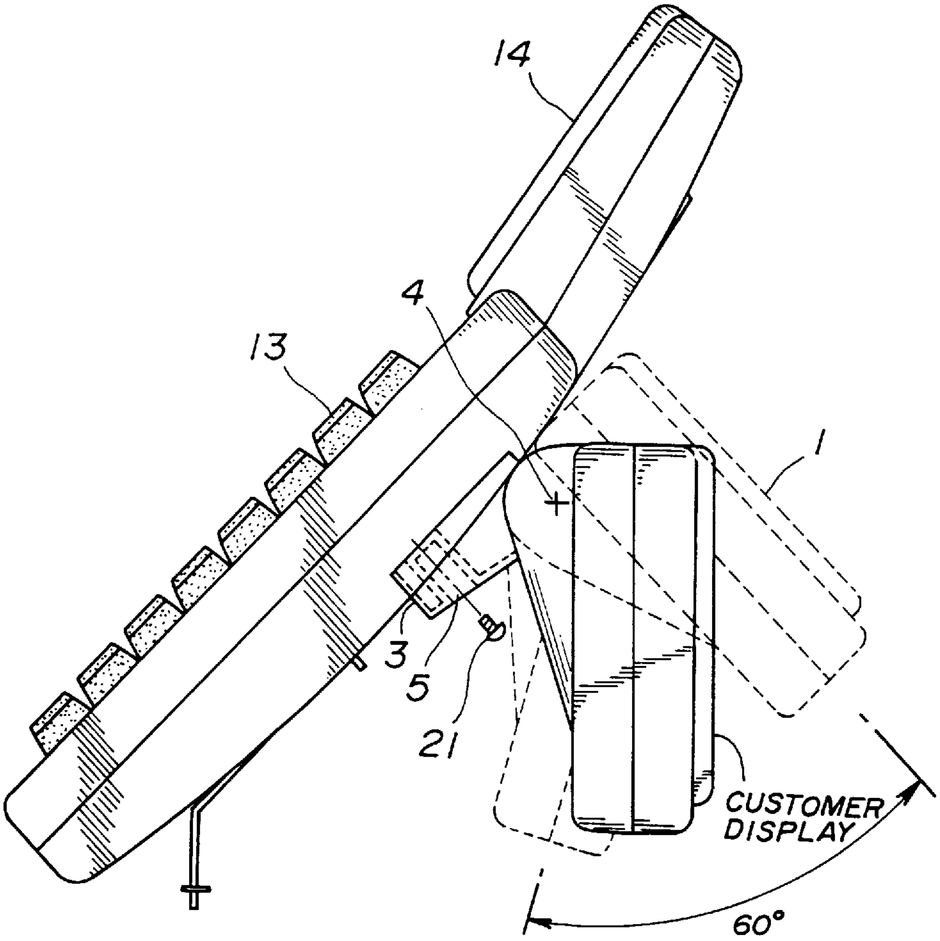
FIG. 5 is a diagram for explaining how the angle of a customer display according to the present invention may be adjusted when the display is attached to the back of a PLU keyboard.

FIG. 5 is a diagram for explaining the way the angle of the customer display according to the present invention may be adjusted when the display is attached to the back of the PLU keyboard. As shown in FIG. 5, a plurality of input keys 13 are aligned on the left hand side (operator side) of the PLU keyboard. Also, an operator display 14 by which an operator can confirm the information input through the keyboard is provided on the top of the keyboard 13 as shown in FIG. 5.

The PLU keyboard and the tilt portion 3 of the customer display are fixed to each other by a screw 21 as shown in FIG. 5. Since the tilt portion 3 is fixed to the PLU keyboard, a portion of the customer display including the display portion 1 is able to rotate around the rotation center 4 and in this way the angle of the display portion 1 may be adjusted. As shown in FIG. 5, the angle of the customer display is adjustable in the range indicated by dotted lines (about 60°) in this embodiment. In addition, the keyboard surface of the PLU keyboard is provided with an inclined angle as shown in FIG. 5 so that an operator can easily perform input operations.

Figure 6:
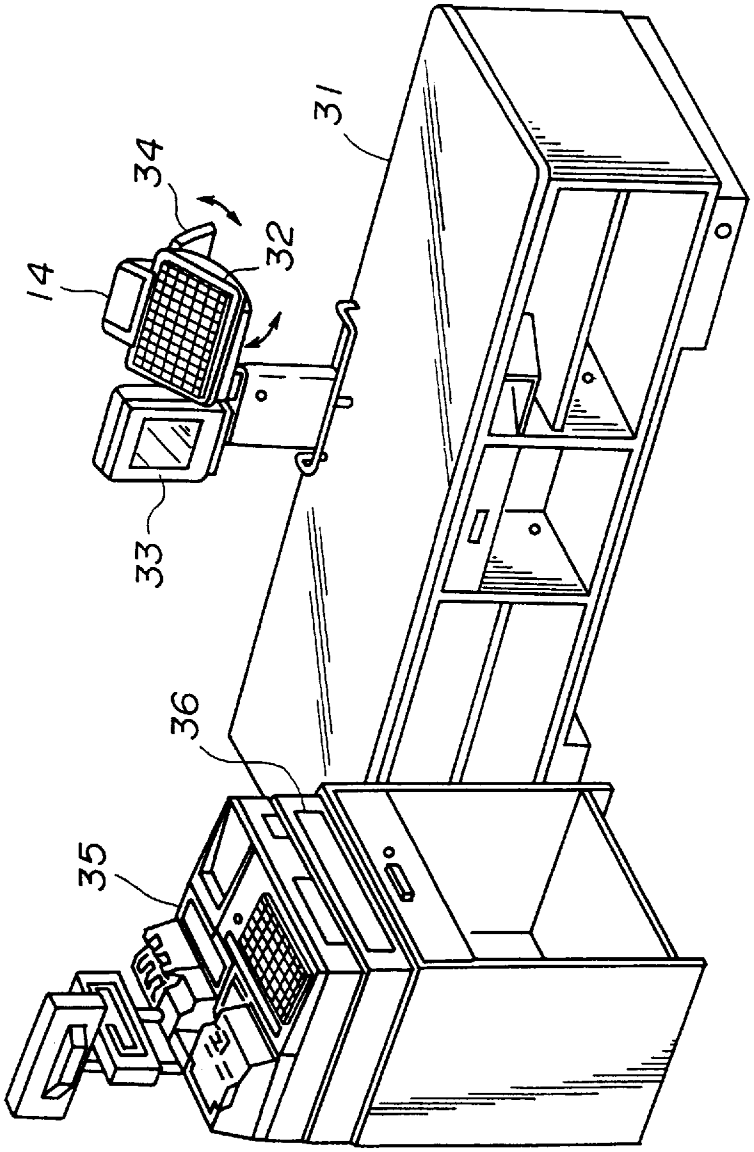
FIG. 6 is a diagram showing an embodiment of a counter provided with a customer display attached to the back of a PLU keyboard according to the present invention.

FIG. 6 is a diagram showing an embodiment of a counter provided with a customer display attached to a PLU keyboard according to the present invention. In FIG. 6, a PLU keyboard 32 and a bar code reader 33 are provided at about a middle of a counter 31. When a bar code attached to a commodity is read, an operator stands in front of the bar code reader 33 and carries out operations to read the bar code using the bar code reader. The PLU keyboard 32 is used when no bar code is attached to a commodity or a bar code cannot be read for some reasons.

As shown in FIG. 6, a customer display 34 is attached to the back of the PLU keyboard 32 with its display portion facing a customer side of the counter (not shown in the figure). The angle of the customer display 34 can be adjusted, as explained above, so that a customer can easily confirm such information as prices and a total price of commodities, which he/she purchased, from the display portion of the customer display 34.

The PLU keyboard 32 is fixed to the counter 31 in a way so that its mounting angle is adjustable. Also, the customer display 34 is fixed to the PLU keyboard in a way so that its mounting angle is adjustable. The angle adjustment of the customer display 34 can be carried out independently of the angle adjustment of the PLU key board 32. For this reason, the angle of the customer display 34 may be adjusted regardless of the mounting angle of the PLU keyboard 32 so that a customer can easily see the display portion of the customer display 34. Thus, it is possible to improve visibility of the customer display 34 without degrading the operability of the PLU keyboard 32 for an operator.

In FIG. 6, the numeral 35 indicates a POS terminal and a drawer 36 is provided underneath the POS terminal. In general, handling of money between a customer and an operator is carried out at a position in front of the POS terminal 35.

As mentioned above, the customer display 34 according to this embodiment of the present invention is fixed to the PLU keyboard 32 using screws and an electrical connection is made through a connector. Thus, the customer display 34 can easily be taken out from the PLU keyboard and fixed to another portion of the counter 31 or anywhere in a shop.

Although screws are used in this embodiment to fix the customer display 34 to the PLU keyboard 32, a fixing member to fix the customer display 34 to a portion of the counter 31 including the PLU keyboard 32 is not limited to the screws and any suitable means including adhesives, adhering layers, adhesive sheets, suction discs, magnets and so on may be used to fix the customer display 34 of the present invention. Thus, if it is required to separate the customer display from the PLU keyboard and fix it to another place in accordance with, say, the space of a counter or a shop, it is easy to respond to such a request using the customer display of the present invention.

Figure 7:
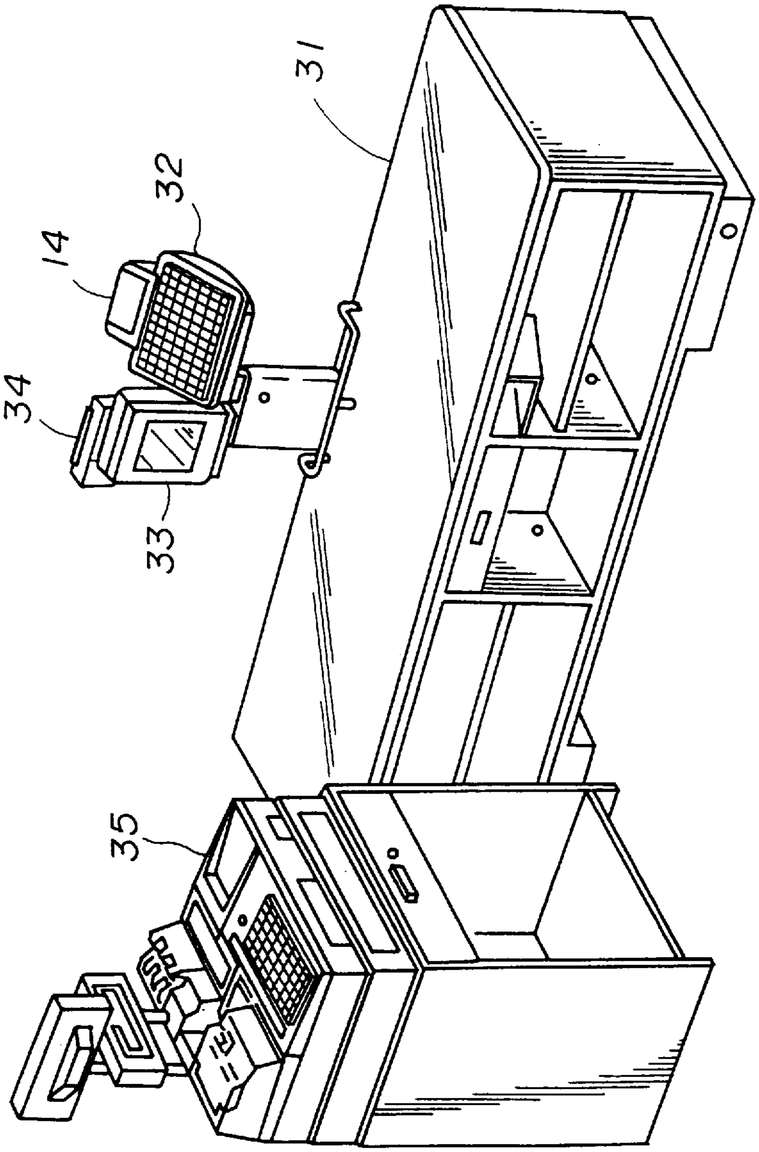
FIG. 7 is a diagram showing an embodiment of a counter provided with a customer display attached to the back of a bar code reader according to the present invention.

FIG. 7 is a diagram showing a counter on which the customer display according to the present invention is attached to the back of a bar code reader. As shown in FIG. 7, the fixing position of the customer display 34 is not restricted to the back of the PLU keyboard 32 and may be fixed to various positions of various devices or things with a desired angle.

As mentioned above, the handling of money between a customer and an operator is carried out in the vicinity of the POS terminal 35. On the other hand, an operation to input commodity information is carried out in the vicinity of the place where the bar code reader 33 and the PLU keyboard 32 are located. Therefore, it is advantageous for a smooth operation to lead a customer whose purchased commodities have finished a bar code checking to the place of the POS terminal 35 so that the next customer can proceed to the position of the bar code reader 33.

The counter 31 shown in FIG. 7 has a structure suitable for the above mentioned purpose. As shown in FIG. 7, the counter 31 is provided with the customer display 34 attached to the back of the bar code reader 33 which is located closer to the POS terminal 35. Thus, it is possible to lead a customer closer to the POS terminal 35 for a distance corresponding to the distance between the PLU keyboard 32 and the bar code reader 33.

Figure 8:
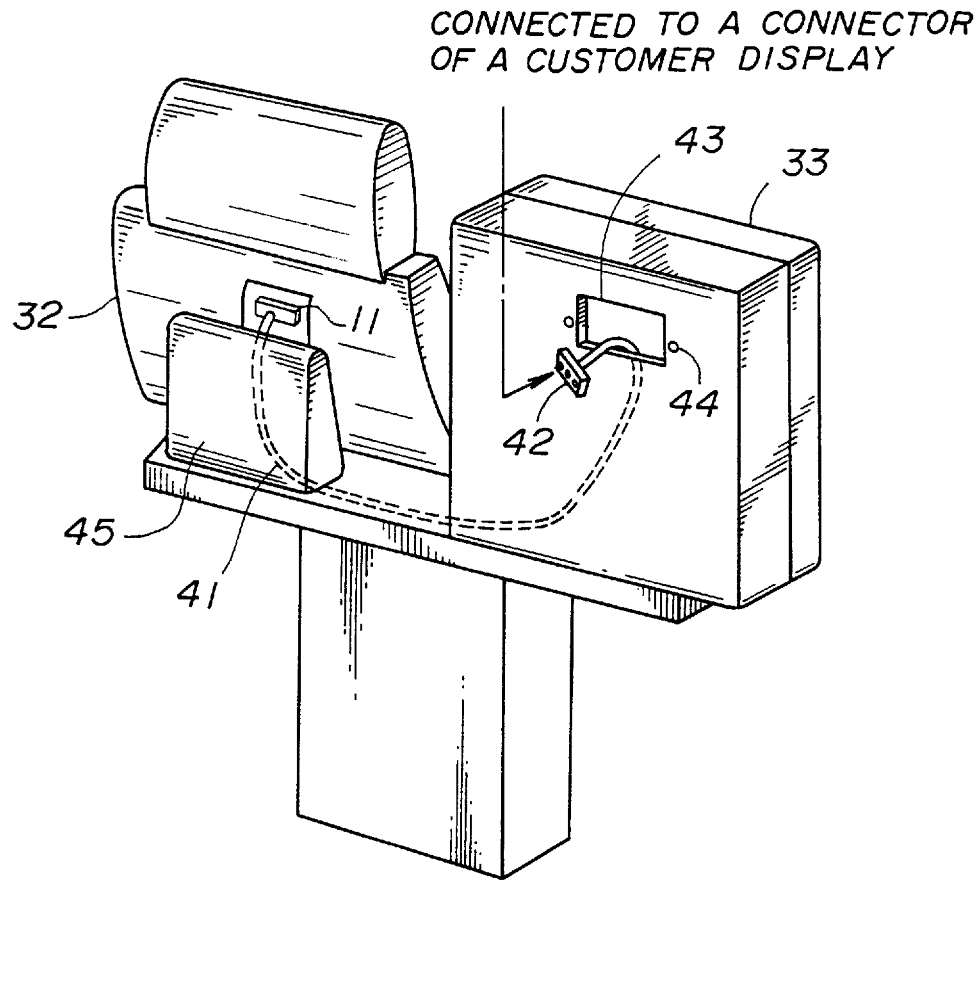
FIG. 8 is a diagram showing a back of a bar coder reader to which the customer display according to the present invention may be attached.

FIG. 8 is a diagram showing the back of the bar coder reader, together with the back of the PLU keyboard, to which the customer display according to the present invention may be attached. Since the customer display 34 according to this embodiment of the present invention is to attach to the PLU keyboard 32, signals necessary for operating the customer display 34 are supplied to the customer display 34 through the PLU keyboard. Thus, when the customer display 34 is fixed to the back of the bar code reader 33, an extension cord 41 is used to connect a connector 11 of the PLU keyboard 32 and a connector of the customer display 34. Two screw holes 44 are formed at both sides of an opening 43 of the back of the bar code reader. The position of the screw holes 44 is corresponds to the position of the screw holes 12 provided at the back of the PLU keyboard shown in FIG. 4.

In FIG. 8, the PLU keyboard 32 has a fixing member 45 for fixing the PLU keyboard 32 to a counter. When fixed, the angle of the PLU keyboard may be adjusted freely.

When the customer display 34 is fixed to the back of the bar code reader 33, the connector 2 of the customer display 34 and the connector 42 extending from the connector 11 of the PLU keyboard 32 are connected and the customer display 34 is fixed to the back of the bar code reader 33 using screws.

Figure 9:
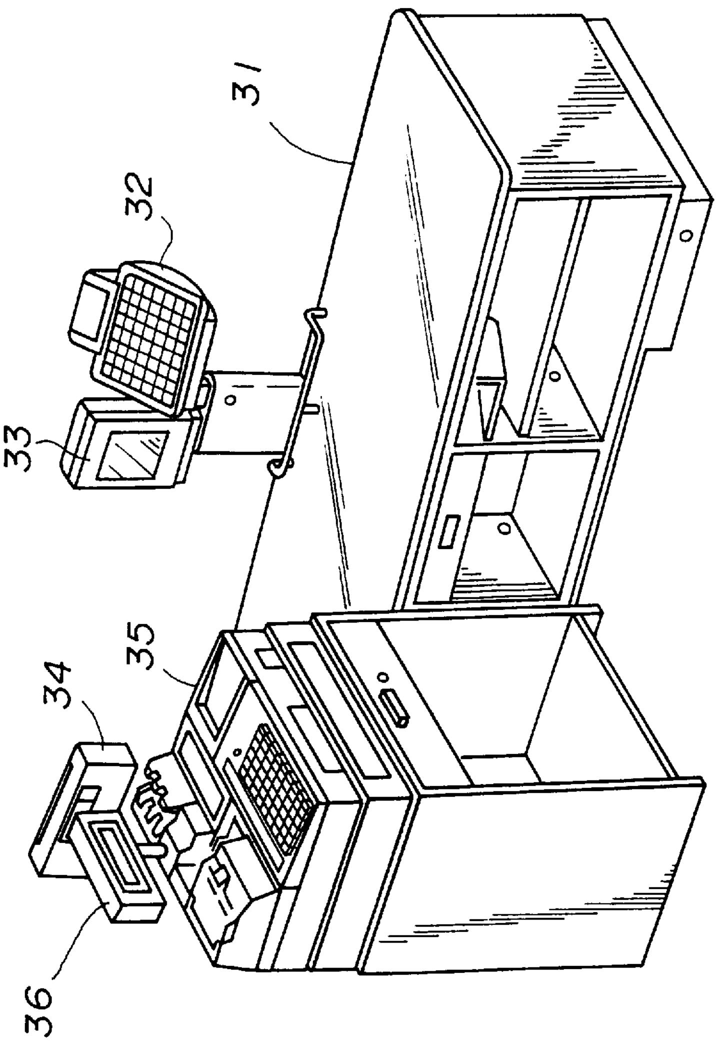
FIG. 9 is a diagram showing an embodiment of a counter provided with a customer display attached to the side of a display for an operator of a POS terminal.

When the area of a shop is small and there is not enough space for a large counter, the customer display 34 may necessarily be fixed to a position closer to the POS terminal 35. In that case, it is possible to attach the customer display 34, for example, on a side surface of a display for an operator 36 as shown in FIG. 9. By this configuration of the counter 31, a customer can proceed to the position in front of the POS terminal 35 while his/her purchased commodities are handled by an operator. Thus, a customer is not required to move from a position in front of the bar code reader 33 and the PLU keyboard 32 to a position in front of the POS terminal 35 after checking the information such as a total price of his/her purchase since he/she can confirm the information in front of the POS terminal where the customer display 34 of the present invention is provided. In this way, handling of money between a customer and an operator can be smoother and space of a shop can be utilized effectively.

As mentioned above, the customer display 34 according to the embodiment of the present invention can be attached to any desired place where appropriate. Fixing members as described above, extension cords, etc., may be used together with the customer display 34 for that purpose.

Although the above embodiments are explained for a customer display, it is possible, of course, to apply the present invention to any other suitable kind of display devices having a tilt mechanism.

In addition, the present invention is not limited to the above embodiments, and variations and modifications may be made without departing from the scope of the present invention.

What is claimed is:

1. A display apparatus comprising:

a device having an operation surface operated by an operator;

a display provided on a back surface of said device;

a tilt mechanism capable of adjusting a tilt of said display with respect to said device; and a connector provided on a back surface of said device, wherein said connector is connected to said display.

2. The display apparatus as claimed in claim 1, wherein said device is a keyboard.

3. The display apparatus as claimed in claim 1, wherein said connector is connected to an external device for supplying power to said display.

4. The display apparatus as claimed in claim 1, wherein said tilt mechanism includes a tilt portion with a plurality of screw holes such that each screw hole of said plurality of screw hole mates with a screw to attach said display to said device.

5. The display apparatus as claimed in claim 4, wherein said tilt portion of said tilt mechanism has a space inside thereof, said space being for accommodating a connector therewithin.

6. The display apparatus as claimed in claim 1, wherein said tilt portion of said tilt mechanism rotates about a center of rotation such that an axis containing said center of rotation is parallel to a longitudinal axis of said display.

7. A display apparatus comprising:

a device having an operation surface operated by an operator;

a display provided on a back surface of said device; and a tilt mechanism capable of adjusting a tilt of said display with respect to said device, wherein said tilt mechanism includes a tilt portion with a plurality of screw holes such that each screw hole of said plurality of screw hole mates with a screw to attach said display to said device.

8. The display apparatus as claimed in claim 7, wherein said device is a keyboard.

9. The display apparatus as claimed in claim 8, further comprising a connector provided on a back surface of said device, wherein said connector is connected to a display.

10. The display apparatus as claimed in claim 7, wherein a connector is connected to an external device for supplying power to said display.

11. The display apparatus as claimed in claim 7, wherein said tilt portion of said tilt mechanism has a space inside thereof, said space being for accommodating a connector therewithin.

12. The display apparatus as claimed in claim 11, wherein said connector is provided on a back surface of said device and said connector is connected to said display.

13. The display apparatus as claimed in claim 7, wherein said tilt portion of said tilt mechanism rotates about a center of rotation such that an axis containing said center of rotation is parallel to a longitudinal axis of said display.

14. A counter provided at least with a POS terminal, an input apparatus and a display apparatus for a customer, wherein said display apparatus comprises:

a device having an operation surface operated by an operator;

a display provided on a back surface of said device; and a tilt mechanism capable of adjusting a tilt of said display, wherein said tilt mechanism includes a tilt portion with a plurality of screw holes such that each screw hole of said plurality of screw hole mates with a screw to attach said display to said device.

15. A counter provided at least with a POS terminal, an input apparatus and a display apparatus for a customer, wherein said display apparatus comprises:

a device having an operation surface operated by an operator;

a display provided on a back surface of said device;

a tilt mechanism capable of adjusting a tilt of said display; and a connector provided on a back surface of said device, wherein said connector is connected to said display.

* * * * *